United States Patent
Holmes et al.

(10) Patent No.: US 7,751,282 B2
(45) Date of Patent: Jul. 6, 2010

(54) SYSTEM AND METHOD FOR PRECISION ACOUSTIC EVENT DETECTION

(75) Inventors: Fred Holmes, Cleveland, OK (US); Ken Fisher, North Hollywood, CA (US); Kevin Baxter, Saugus, CA (US)

(73) Assignee: Shotspotter, Inc., Mountain View, CA (US)

(*) Notice: Subject to any disclaimer, the term of this patent is extended or adjusted under 35 U.S.C. 154(b) by 84 days.

(21) Appl. No.: 12/202,268

(22) Filed: Aug. 30, 2008

(65) Prior Publication Data

US 2009/0109796 A1 Apr. 30, 2009

Related U.S. Application Data

(63) Continuation of application No. 10/905,760, filed on Jan. 20, 2005, now Pat. No. 7,420,878.

(51) Int. Cl.
*G01S 5/18* (2006.01)
*G01S 5/14* (2006.01)

(52) U.S. Cl. .................... 367/128; 342/357.03

(58) Field of Classification Search ............. 367/128, 367/906; 342/357.03, 357.02, 357.06, 357.14; 701/207, 213; 340/988
See application file for complete search history.

(56) References Cited

U.S. PATENT DOCUMENTS

| | | | |
|---|---|---|---|
| 5,455,868 A | 10/1995 | Sergent et al. | |
| 5,714,948 A | 2/1998 | Farmakis et al. | |
| 5,877,725 A | 3/1999 | Kalafus | |
| 6,028,514 A | 2/2000 | Lemelson et al. | |
| 6,054,928 A | 4/2000 | Lemelson et al. | |
| H1916 H | 11/2000 | Hollander | |
| 6,178,141 B1 | 1/2001 | Duckworth et al. | |
| 6,212,475 B1 | 4/2001 | France et al. | |
| 6,237,496 B1 * | 5/2001 | Abbott | 102/384 |
| 6,437,696 B1 | 8/2002 | Lemelson et al. | |
| 6,647,340 B1 | 11/2003 | Pemble et al. | |
| 6,678,589 B2 | 1/2004 | Robertson et al. | |
| 6,801,854 B1 | 10/2004 | Pemble et al. | |
| 6,847,587 B2 | 1/2005 | Patterson et al. | |
| 6,903,682 B1 | 6/2005 | Maddox | |
| 7,139,222 B1 | 11/2006 | Baxter et al. | |
| 7,203,132 B2 | 4/2007 | Berger | |
| 2002/0003470 A1 | 1/2002 | Auerbach | |
| 2002/0027524 A1 | 3/2002 | Pippin | |
| 2002/0067272 A1 | 6/2002 | Lemelson et al. | |
| 2004/0100868 A1 | 5/2004 | Patterson et al. | |
| 2006/0095199 A1 | 5/2006 | Lagassey | |
| 2006/0161339 A1 | 7/2006 | Holmes et al. | |
| 2006/0280033 A1 | 12/2006 | Baxter et al. | |

* cited by examiner

*Primary Examiner*—Dan Pihulic
(74) *Attorney, Agent, or Firm*—DLA Piper LLP (US)

(57) ABSTRACT

A system and method for providing precision locations for sensors which make up an array of sensors in a gunshot detection system. In a preferred embodiment sensors employ a commercial GPS which reports a sensor position or a group of pseudoranges to GPS satellites. A server collects differential information from a differential node and, in one preferred embodiment, calculates a precision position for each sensor by adjusting the reported position or pseudoranges with the differential information. In another preferred embodiment differential information is sent from the host to individual sensors which calculate their own precision positions. Differential information may be latitude and longitude corrections, pseudorange corrections, ionospheric delay, GPS satellite clock drift, or other corrective term which will improve the accuracy of a sensor position.

21 Claims, 6 Drawing Sheets

SYSTEM AND METHOD FOR PRECISION ACOUSTIC EVENT DETECTION

CROSS REFERENCE TO RELATED APPLICATION(S)

This is a continuation of application Ser. No. 10/905,760, filed Jan. 20, 2005, published as US2006/0161339A1, now U.S. Pat. No. 7,420,878, which claim priority back to U.S. Provisional Application No. 60/481,915, filed Jan. 19, 2004, all of which are hereby incorporated by reference in entirety.

BACKGROUND

1. Field

The present invention relates to a system and method for detecting and locating an acoustic event. More particularly, but not by way of limitation, in a system for identifying and locating an acoustic event, the present invention provides a system and method for achieving highly accurate position information for individual sensors.

2. Description of Related Information

Gunfire and sniper detection systems are generally known in the art. Such systems can be broadly grouped into three categories: systems which pinpoint the precise location of the source of gunfire; azimuthal sensors which provide an indication of the radial direction to the source of gunfire; and proximity sensors which merely provide an indication that nearby gunfire was detected. While such systems have been demonstrated to perform well in both law enforcement and military applications, the entire field is presently an emerging technology.

In many large cities, gun-related violence has become a plague of epidemic proportions. Urban gunfire, whether crime-related or celebratory in nature, results in thousands of deaths per year in the United States alone. Gunfire location systems, such as those installed in the Redwood City, Calif., Glendale, Ariz., Willowbrook, Calif., City of Industry, Calif., and Charleston, S.C. areas, have proven to be effective in reducing law enforcement response time to detected gunfire, apprehending criminals, collecting evidence, and reducing the occurrence of celebratory gunfire. One such system is described in U.S. Pat. No. 5,973,998, issued to Showen, et al., which is incorporated herein by reference.

Showen, et al. discloses a system wherein sensors are placed at a density of roughly six to ten sensors per square mile. Audio information is sent to a computer at a central location and processed to: detect a gunshot; determine a time of arrival for the gunshot at each sensor; and calculate a location of the shooter from the differences in the times of arrival at three or more sensors. Showen, et al. takes advantage of the long propagation distance of gunfire to place sensors in a relatively sparse array so that only a few of the sensors can detect the gunfire. This permits the processor to ignore impulsive events which only reach one sensor—a concept called "spatial filtering." This concept of spatial filtering radically reduces the sensor density compared to predecessor systems, which require as many as 80 sensors per square mile.

Another gunshot location system is described in co-pending U.S. patent application Ser. No. 10/248,511 by Patterson, et al., filed Jan. 24, 2003, which is incorporated herein by reference. Patterson, et al., discloses a system wherein audio information is processed within each sensor to detect a gunshot and determine a time of arrival at the sensor. Time of arrival information, as determined from a synchronized clock, is then transmitted wirelessly by each sensor to a computer at a centralized location where a location of the shooter is calculated in the same manner as in the Showen, et al. system.

As yet, azimuthal systems have not been as widely accepted as, for example, the Showen, et al. system. Azimuthal sensors typically employ one or more closely-spaced sensors, where each sensor includes several microphones arranged in a small geometric array. A radial direction can be determined by measuring the differences in arrival times at the various microphones at a particular sensor. Presently such systems suffer from somewhat limited accuracy in the determination of the radial angle, which in turn, translates into significant errors in the positional accuracy when a location is found by finding the intersection of two or more radial lines, from corresponding sensors, directed toward the shooter. Since errors in the radial angle result in ever increasing positional error as the distance from the sensor to the source increases, the reported position will be especially suspect toward the outer limits of the sensors' range.

To provide an absolute location for an event, the location of reporting sensors must be known. In a fixed system, the location of each sensor can be surveyed at the time the sensors are placed. In a system with moving or re-locatable sensors, each sensor typically self-surveys with a global positioning system receiver ("GPS") or other such system. As will be appreciated by those skilled in the art, several factors can impact the accuracy of a location provided by a GPS receiver which, in turn, impacts the accuracy of a source location provided by the gunshot location system.

GPS receivers can be broadly divided into two categories, commercial or civilian receivers and military receivers. Commercial GPS receivers use the LI frequency of the GPS signal to acquire the timing information used to determine position and perhaps the L2 frequency to determine atmospheric delays while military receivers use both the LI and L2 frequencies to determine the position. Encryption keys to decode the L2 signal are controlled by the U.S. government and generally restricted to military applications. In general, military GPS receivers are more accurate than their commercial counterparts but, for a variety of reasons, tend to be larger, consume more electrical power, and are dramatically more expensive. In times past, selective availability ("SA") was employed to further degrade the positional accuracy of commercial GPS receivers. However, the U.S. government is now fully committed to eliminating SA except regionally at times of conflict or other such threat.

A number of schemes have been developed to improve the accuracy of commercial GPS receivers such as: differential GPS ("DGPS") where a network of fixed ground-based reference stations broadcast the difference between actual pseudoranges and measured pseudoranges; the Wide-Area Augmentation System ("WMS") which uses a series of ground-based stations operating in concert with a constellation of geosynchronous satellites to provide WAAS enabled GPS receivers with information such as atmospheric delay, individual satellite clock drift, and the like; Local-Area Augmentation Systems which are WAAS-like in nature but transmit the corrective information from ground-based stations locally, instead of satellites; as well as others. Each system presently suffers from limitations, such as: DGPS requires a second receiver and a nearby ground-based station and DGPS is particularly useful for overcoming the effects of SA but is of less value since SA is generally no longer active and WMS has broader coverage; the WAAS system is limited to North America, requires a clear view of the southern sky, and is still in deployment such that presently not all areas enjoy reliable WAAS augmentation; and LAAS systems will have very limited coverage, strictly near major airports and require specialized receivers.

As it relates to gunshot detection systems, the accuracy of commercial GPS receivers is somewhat limiting. Unfortunately, military GPS receivers are generally not available for law enforcement applications and thus, such acoustic sensors are limited by the characteristics of commercial receivers. Even in military applications, with battery-operated gunshot detection sensors, such as soldier-worn sensors, the size, weight, cost, and electrical power consumption of military GPS receivers presently tips the balance towards using a commercial version, despite accuracy concerns.

It is thus an object of the present invention to provide a system and method for improving the positional accuracy of an array of self-surveying acoustic sensors which incorporate commercial GPS receivers.

SUMMARY

The present invention provides a system and method for improving the positional accuracy of acoustic sensors in a gunshot detection system. In a preferred embodiment, the inventive system includes: a plurality of acoustic sensors dispersed throughout a monitored area, each sensor having a commercial GPS receiver; a host processor at a known location, the host processor also having a commercial GPS receiver; and a communication network adapted to deliver information from the sensors to a host processor. Since the location of the host is known, errors in the GPS provided position at the host are used to correct the positional information provided by each sensor to improve the accuracy of the reported position of the source of an event.

In one preferred embodiment, the host is located at a fixed, surveyed position. Unlike DGPS and WAAS, no special receiver is required since the correction for all reporting sensors is performed at a centralized location.

In another preferred embodiment, the host further includes a military GPS receiver, or similar highly accurate positioning system, thus making the host portable or relocatable. Since the position of the host is always known with a high degree of accuracy, differences between the reported positions of the commercial receiver and the military receiver can be determined and applied to the positions of reporting sensors.

Further objects, features, and advantages of the present invention will be apparent to those skilled in the art upon examining the accompanying drawings and upon reading the following description of the preferred embodiments.

DESCRIPTION OF EXEMPLARY IMPLEMENTATIONS

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Figure 1:
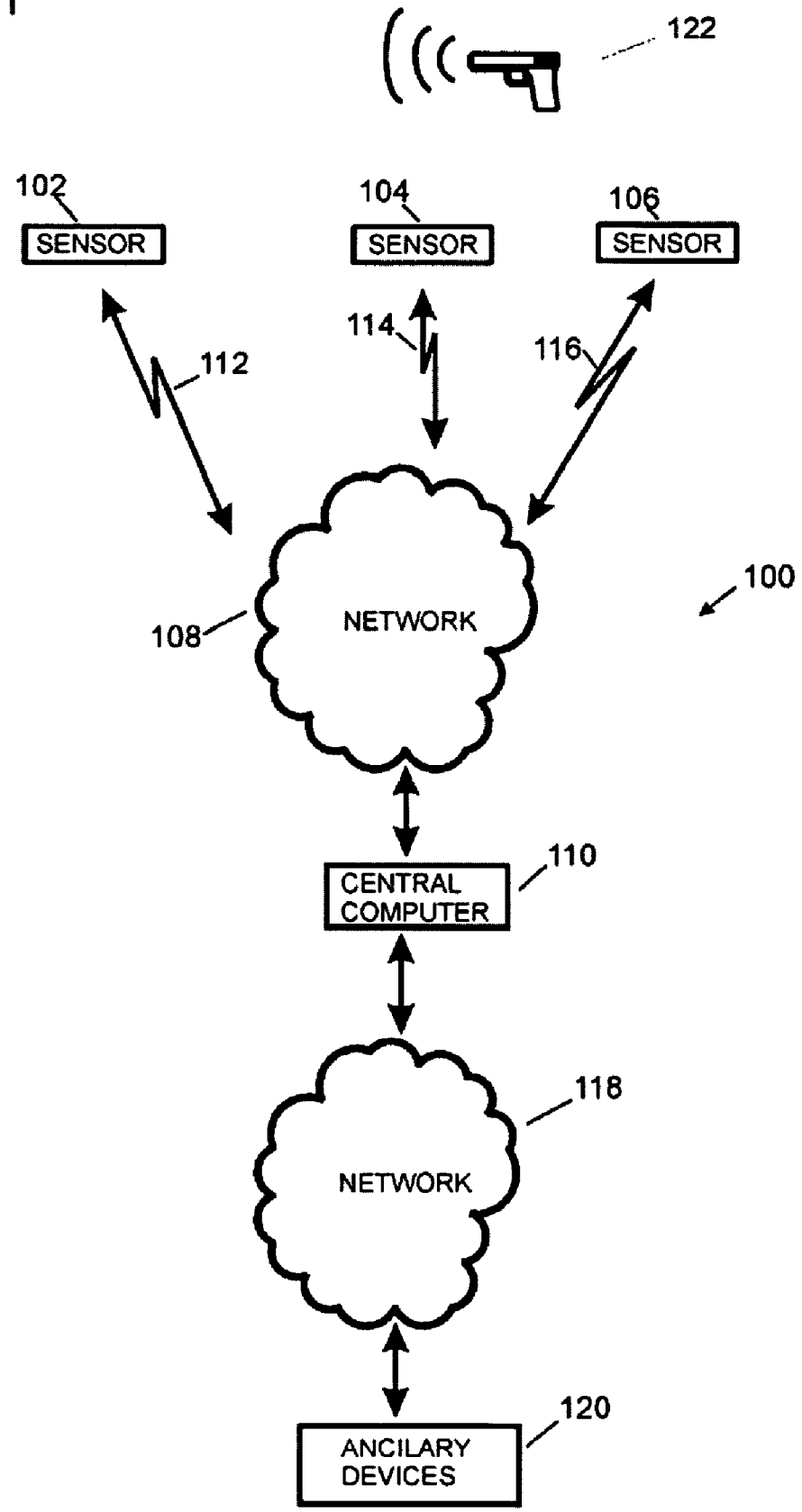
FIG. 1 depicts a preferred configuration of the inventive gunshot detection system.

Referring now to the drawings, wherein like reference numerals indicate the same parts throughout the several views, a representative gunshot detection system 100 is shown in its general environment in FIG. 1. In a preferred embodiment, a plurality of sensors 102-106 are dispersed over a monitored area. Preferably, each sensor is placed such that it has a relatively unobstructed acoustic view around its immediate area. By way of example and not limitation, suitable sites include: placed atop a building; placed atop utility or light poles; on towers, etc. Typically sensors 102-106 communicate through a communication network 108 with a centralized processor 110 wherein information concerning acoustic events is processed to provide details of the event, such as the source location of a gunshot, time of the gunshot, the number of detected gunshots, the type of event, and the like. It should be noted that sensors 102-106 may be any combination of wired or wireless sensors, that communications paths 112-116 may carry either analog or digital signals, and that network 108 may comprise any combination of sub-networks, such as, by way of example and not limitation: a telephone network; the internet; a private computer network; a wireless network, or even a collection of dedicated wires routed to the sensor array.

In a military environment it may be preferable that sensors 102-106 are man-wearable. In such a system, the host computer 110 and display devices 120 would likely be carried by a squad leader. In such as a system, other ancillary systems may use data collected by the system and reported in real time, or near real time, to higher levels or command centers.

As will be appreciated by those skilled in the art, information about a detected acoustic event is typically output to a person of interest such as a police dispatcher or directly to individual officers, as through network 118 to display devices 120 or a computer console. When weapon 122 is fired, the muzzle blast reaches sensors 102-106 at different times based on the speed of sound and the distance of each sensor from the shooter. Whether the acoustic information is processed at the sensor, or at computer 110, a time of arrival is determined for each sensor and the differences of the various times of arrival are processed to determine a location of the source of the gunshot. In response to the gunshot, information is provided at device 120.

Figure 2:
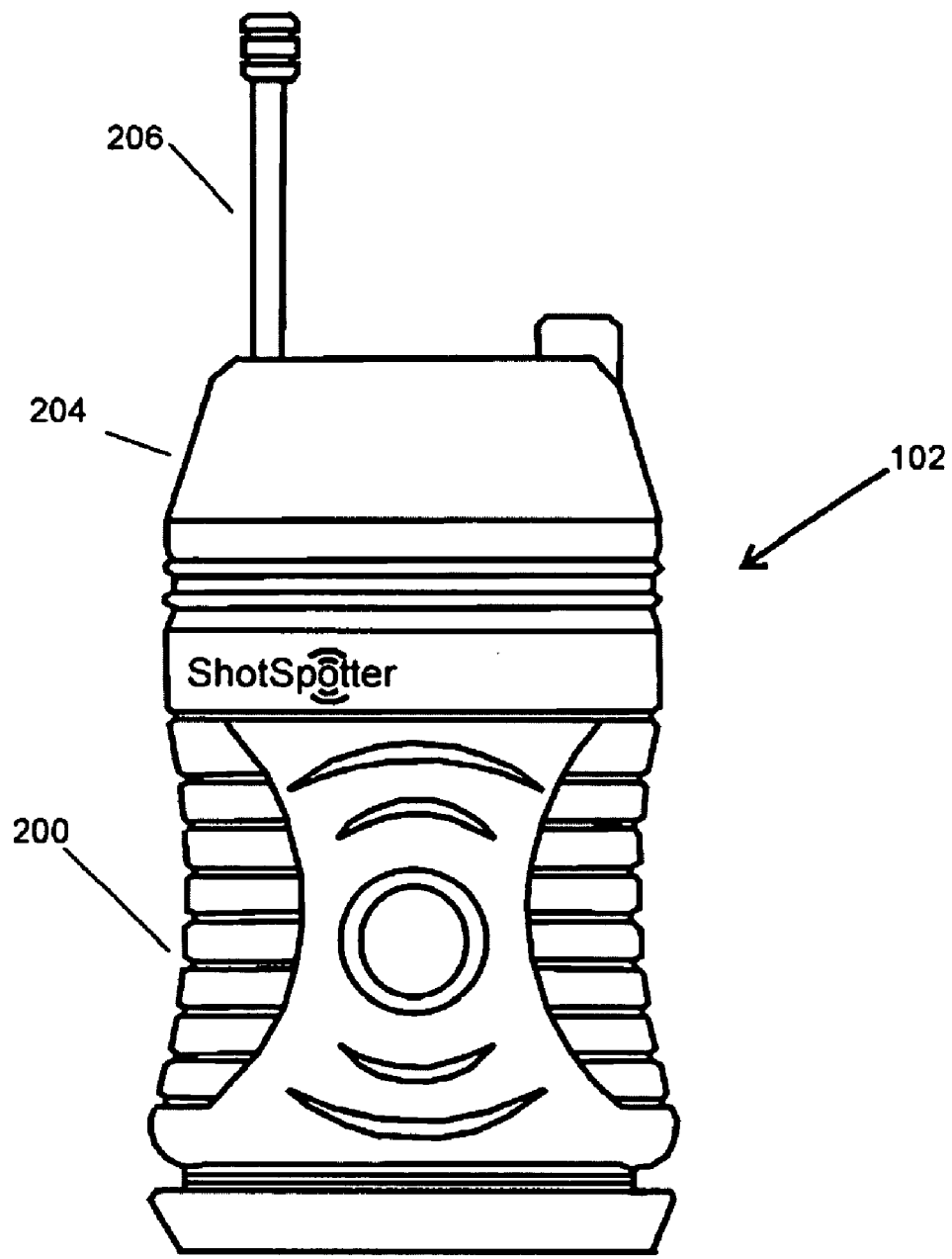
FIG. 2 provides a perspective view of a preferred embodiment of a sensor as employed in the inventive system.

A preferred embodiment of a sensor 102 is shown in FIG. 2. Typically sensor 102 includes a housing 200, a support (not shown) for mounting sensor 102, and a windscreen 204 for protecting internal elements from the environment, while allowing acoustic waves to pass through to the interior. If sensor 102 is wireless, antenna 206 is provided for radio frequency communication.

Figure 3:
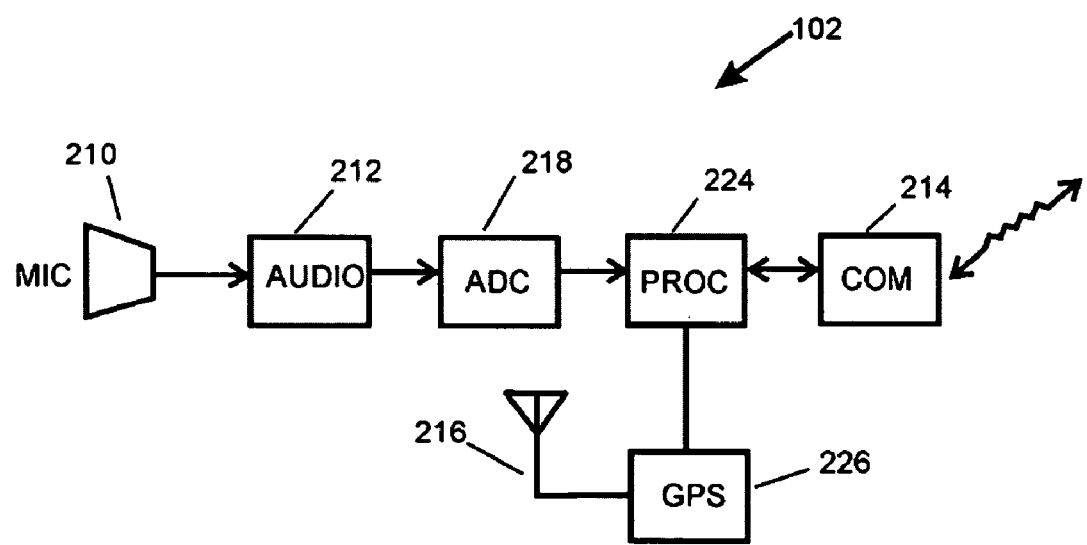
FIG. 3 provides a block diagram of a preferred embodiment of the sensor.

With reference to FIG. 3, a preferred embodiment of a wireless sensor 102 includes: a microphone 210 for receiving acoustic information; an amplifier and/or other signal conditioning 212; a processor 224, typically a digital signal processor ("DSP"), as are well known in the art; a satellite positioning receiver, e.g. a GPS 226 and GPS antenna 216; and an interface 214 for communication via a communication network. It should be noted that in such a sensor, GPS receiver 226 may play two roles, providing positional information as to the sensor's location and an exceptionally accurate real time clock. In one preferred embodiment, DSP 224 includes an analog-to-digital converter 218 to digitize the audio signal for processing to detect a gunshot and determine the time of arrival of the gunshot. A sensor suitable for use with the present invention is described in co-pending U.S. patent application Ser. No. 10/248,511 by Patterson, et al., filed Jan. 24, 2003, which is incorporated by reference hereinabove.

As will appreciated by those skilled in the art, if sensor 102 is man wearable, whether for military or law enforcement applications, size and weight are important considerations. In turn, electrical power consumption is likewise of prime concern since it has a direct impact on the size and weight of batteries required to operate sensor 102.

Figure 4:
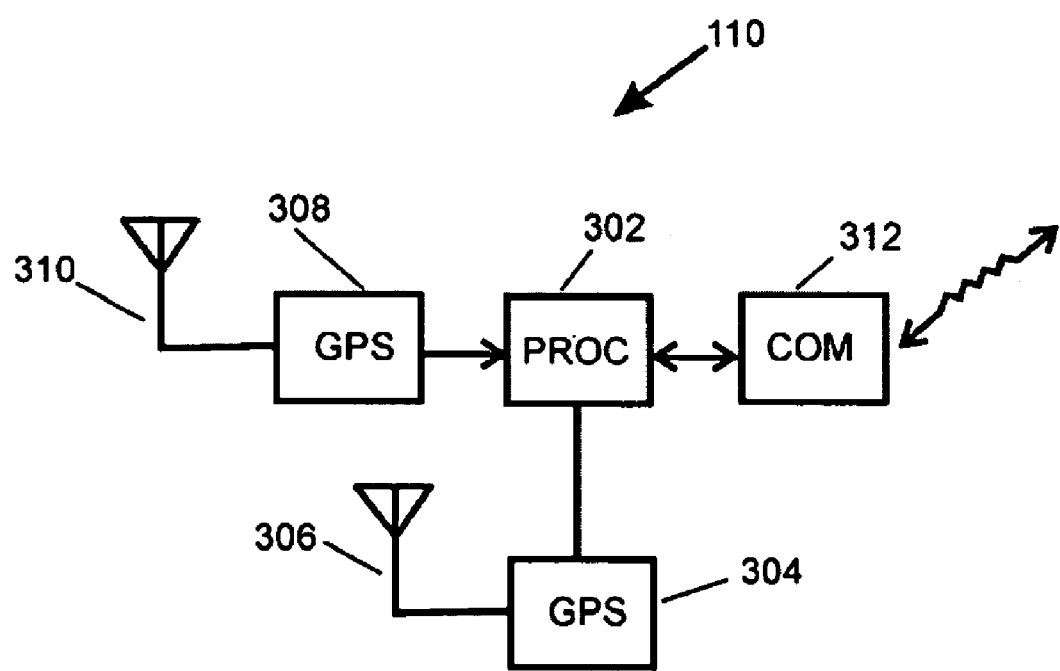
FIG. 4 provides a block diagram for a preferred embodiment of the host node of the inventive system.

With presently known gunshot detection systems, it is not possible to provide an accurate position of the shooter with a single sensor. As a result, the calculation of a shooter position requires computation based on the outputs of a plurality of sensors. In a preferred embodiment the sensors communicate with a computer or server 110 as shown in FIG. 4, also referred to herein as a "host node". Server 110 preferably comprises: CPU 302; an interface 312 for communication via a communication network; commercial GPS receiver 304; and GPS antenna 306. If the host node is portable or re-locatable, preferably host node 110 further includes military GPS 308, or other precision position locating system. It should be noted that GPS 308 likewise includes an antenna 310 although both GPS 304 and 308 can alternatively share a single antenna.

With further reference to FIG. 3, in practice a gunshot is received by microphone 210 at three or more sensors 102. At each sensor 102 the received audio is amplified by amplifier 212, digitized through A/D converter 218, and processed in processor 224 to determine if the sound is indeed a gunshot and, if so, a time of arrival of the event. A position is then retrieved from GPS 226 and transmitted via interface 214 to the host 110. At the host 110, if three or more sensors report the event, the precise positions of the each sensor are determined by comparing the position reported by receiver 304 with the known position of host 110 and applying the correction to the reported positions from each sensor. After determining precision locations for each sensor, the differences in the times of arrivals from the reporting sensors are used to calculate the source location of the gunshot.

Figure 6:
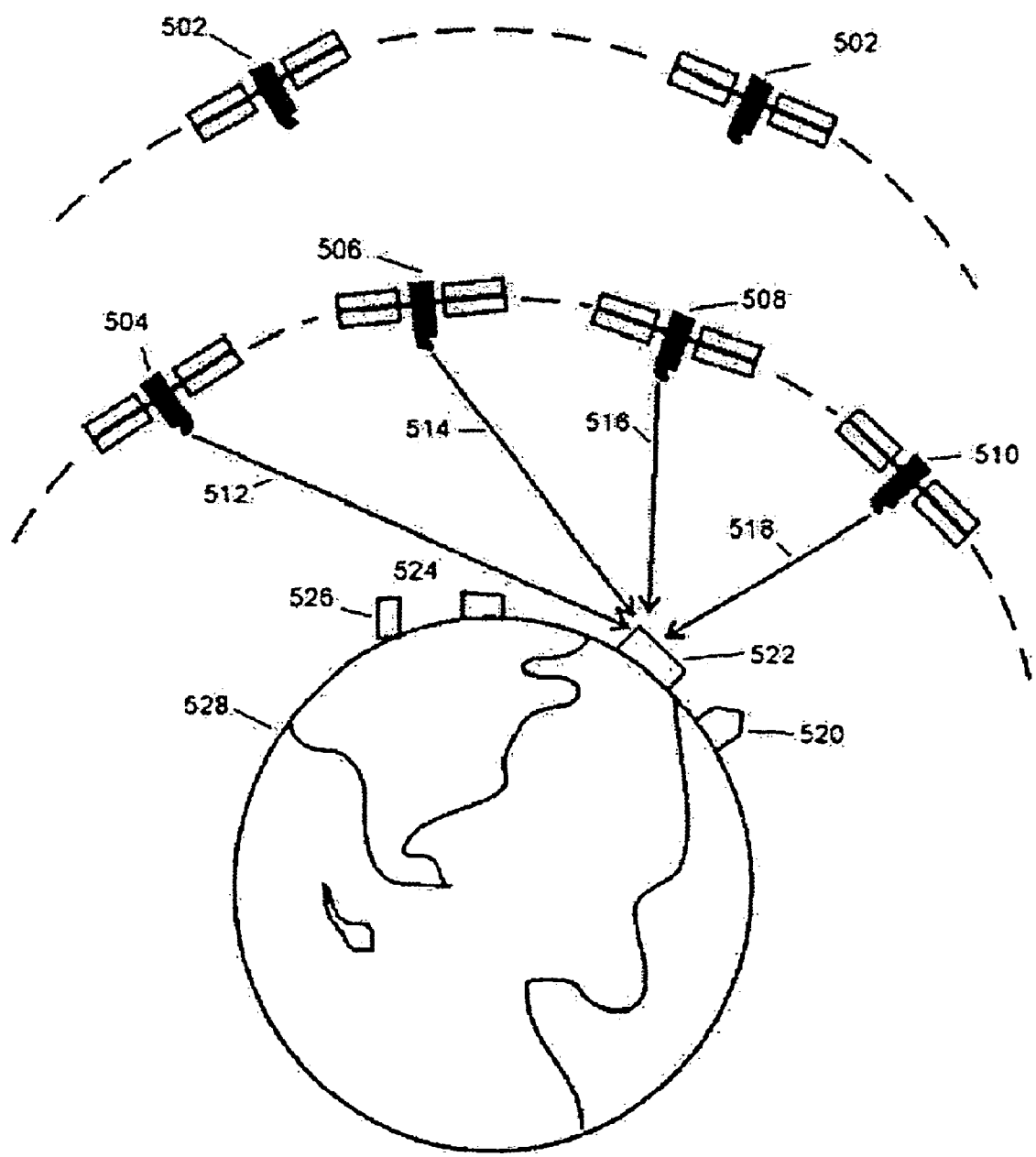
FIG. 6 provides a diagram showing the relationship of the inventive system to the GPS and WMS constellations.

Turning to FIG. 6, while the GPS system is well known in the art, a brief description of the system and it relationship to the present invention may be helpful. The GPS constellation, represented by satellites 504-510, presently consists of 24 satellites in orbits which are not geosynchronous. Thus the number of satellites, the particular satellites, and their positions in the sky, relative to a point on earth, is always changing. Above the GPS satellites 504-510, in a geosynchronous orbit, are the WAAS satellites 502. Each GPS satellite 504-510 constantly sends, among other things, timing information on its L1 carrier. Information regarding each satellite and its position in space, sometimes called the almanac, is broadcast to all GPS receivers, i.e. 520-524, so that each receiver can determine the position of each satellite in the sky. Since the receiver, using 522 as an example, knows the position of each GPS satellite 504-510 and since it receives time referenced signals from the GPS satellites, using the differences in the time of travel of the signal, receiver 522 can determine the distances 512-518 to satellites 504-510, respectively. These distances are known as "pseudoranges." For receiver 522, finding its position on earth is simply a matter of finding the intersections of the spheres defined by a satellite at the center and having a radius equal to the corresponding pseudorange. It is generally held that a GPS receiver using only the L1 frequency can normally find its position in two dimensions within 10 meters.

A number of conditions exist which are outside of the control of receiver 522 which may affect the accuracy of the calculation. One example is ionospheric delay. As radio frequencies enter the atmosphere, there may be some degree of refraction as the wave strike the ionosphere. As can be seen in FIG. 6, the incidence angle between a satellite and the atmosphere, relative to receiver 522, changes with the satellites position in the sky. The resulting refraction slightly distorts the path to receiver 522, causing the signal to arrive late. Another condition is GPS clock drift. Since pseudo ranges are determined based on time of transmission relative to the speed of light, even slight inaccuracies in the time clocks between satellites will impact the position determination.

To overcome such errors, ground stations, represented by station 526, have been established as part of WAAS in the United States and EGNOS in Europe. Each station is at a precise location and, since the precise locations of the satellites are also known from the almanac, errors in the pseudoranges can be determined. Once the errors are determined, the contributing factors are determined, whether from ionospheric delay or clock drift, and the information is up-linked to satellites 502 which return the information to receiver 522. Receiver 522 can then correct its calculated pseudoranges and calculate an improved position. When WAAS is available to a WAAS enabled receiver, it is generally held that the normal accuracy is about one meter.

GPS satellites 504-510 also transmit information on an L2 frequency. Since L2 and L1 are different, a receiver 512 using both frequencies can determine the differences in the pseudoranges from each signal and determine the degree to which the signals were delayed through the atmosphere.

In one preferred embodiment sensors 102 report pseudoranges along with a current position to host 110. At host 110, the pseudoranges are adjusted to reflect atmospheric delay or clock drift based on the pseudoranges received at GPS receiver 304 and in light of the known position of host 110. Alternatively, atmospheric delay and clock delay values may be transmitted from host 110 to the sensor array such that pseudorange corrections are applied at each sensor 102 before its position is reported.

Figure 5:
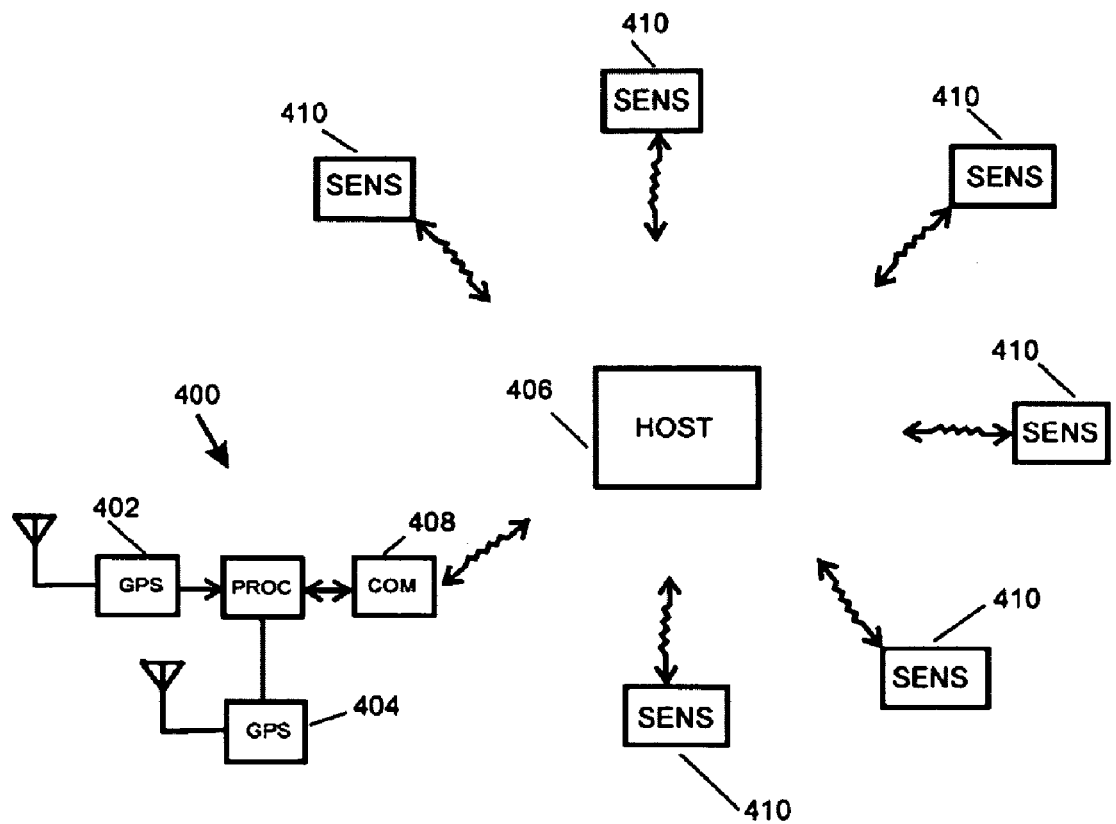
FIG. 5 provides a block diagram for a preferred embodiment of the inventive system having a dual GPS node independent of the host.

In other preferred schemes, the host position does not need to be known. In one such scheme, as shown in FIG. 5, a differential node 400 having a military GPS 402, and optionally a commercial GPS 404, is located remote from host 406. Differential and atmospheric delay information is collected at differential node 404 and periodically transmitted to the host 406 via a network interface 408. Host 406 either uses the received information to improve the precision of sensors positions or, alternatively, passes the information on to sensors 410 so that sensors 410 can calculate and report precision locations. It should be noted that ionospheric delay could be estimated within GPS 402 without resorting to GPS 404.

In another scheme suitable for use where WAAS signals are available, WAAS information is collected by the host, either through its local GPS receiver, from a differential node, or from any sensor which is receiving WAAS information. The WAAS information is then either used by the host to improve the precision of sensor locations or passed on to sensors, which are not receiving WAAS information directly, where the information is used to improve the precession of reported locations.

It should be noted that the term "differential node" is used to describe any node, whether also a host or server, a specialized sensor, or a dedicated node, which provides differential position, pseudorange correction, ionospheric or atmospheric delay, GPS satellite clock drift, WAAS information, or other information used to improve the accuracy of a position fix provided by a sensor. It should also be noted that while sensors subject to correction from such differential data should be proximate the differential node, since the GPS satellites are thousands of miles above earth, proximate distances between sensors and the differential node may be in excess of one hundred miles. "Proximate" is used to describe distances where the corrective information provides meaningful improvement in the calculated position of a sensor.

It should also be noted that while preferred embodiments of the inventive systems were described with reference to a GPS positioning system, the invention is not so limited. The inventive system can also be used to improve the accuracy of positions obtained from other positioning system such as, byway of example and not limitation: GNSS, GLONASS, Galileo, MSAS, Look-Down, LORAN, etc. Similarly, the term "WAAS" should be construed broadly to include any satellite based augmentation system, such as EGNOS and the like. Such changes are within the scope and spirit of the present invention.

It should also be noted that while preferred embodiments of the present invention have been described in connection with gunshot location systems, the techniques for providing precision locations from an array of GPS based sensor can be applied to other types of systems, such as those monitoring environmental conditions, geophysical data collection, and the like.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the scope and spirit of this invention.

We claim:

1. A weapon fire detection sensor comprising:
   a microphone for receiving an acoustic signal of a weapon fire event;
   a first commercial GPS receiver that provides commercial GPS sensor location information regarding the sensor;
   a network interface configured to communicate with a host processing unit that is associated with an array of sensors and has a second commercial GPS receiver and a military GPS receiver; and
   a processor that:
      receives, via the network interface, a precise location of the sensor calculated by the host processing unit as a function of the commercial GPS sensor location information, a commercial GPS signal from the second commercial GPS receiver, and a military GPS signal from the military GPS receiver; and
      determines a precise source location of the weapon fire event using the precise location of the sensor, wherein the precise source location of the weapon fire event is more accurate than weapon fire source location information obtained without using the precise location.

2. The sensor of claim 1, wherein time of arrival information from a plurality of microphones arranged in an array is used to determine the precise source location without use of bullet shockwave data.

3. The sensor of claim 2, wherein sensor position is provided using a plurality of pseudoranges.

4. The sensor of claim 1, wherein sensor position is provided using a plurality of pseudoranges.

5. The sensor of claim 1, wherein GPS position information is provided using a plurality of pseudoranges.

6. The sensor of claim 1, wherein calculation of the precise location of the sensor includes adjusting commercial GPS sensor location information with correction information determined by the host processing unit.

7. The sensor of claim 6, wherein sensor position is provided using a plurality of pseudoranges.

8. The sensor of claim 6, wherein GPS position information is provided using a plurality of pseudoranges.

9. A weapon fire detection sensor comprising:
   a microphone for receiving an acoustic signal of a weapon fire event;
   a first commercial GPS receiver that provides commercial GPS sensor location information regarding the sensor;
   a network interface configured to communicate with a host processing unit that is associated with an array of sensors and has a second commercial GPS receiver and a military GPS receiver, wherein the network interface is configured to receive, from the host processing unit, precision position information determined as a function of a commercial GPS signal from the second commercial GPS receiver and a military GPS signal from the military GPS receiver; and
   a processor that:
      calculates a precise location of the sensor as a function of the commercial GPS sensor location information and the precision position information; and
      determines a precise source location of the weapon fire event using the precise location of the sensor, wherein the precise source location of the weapon fire event is more accurate than weapon fire source location information obtained without using the precise location of the sensor.

10. The sensor of claim 9, wherein time of arrival information from a plurality of microphones arranged in an array is used to determine the precise source location without use of bullet shockwave data.

11. The sensor of claim 10, wherein sensor position is provided using a plurality of pseudoranges.

12. The sensor of claim 9, wherein sensor position is provided using a plurality of pseudoranges.

13. The sensor of claim 9, wherein GPS position information is provided using a plurality of pseudoranges.

14. The sensor of claim 9, wherein calculation of the precise location of the sensor includes adjusting commercial GPS sensor location information with correction information determined by the host processing unit.

15. The sensor of claim 14, wherein sensor position is provided using a plurality of pseudoranges.

16. The sensor of claim 14, wherein GPS position information is provided using a plurality of pseudoranges.

17. A computer readable medium containing computer readable instructions executable to perform a method for determining a precise source location of a weapon fire event detected by a weapon fire detection sensor, the method comprising:
   processing an acoustic signal of a weapon fire event detected at a microphone in the weapon fire detection sensor;
   receiving commercial GPS sensor location information regarding the weapon fire detection sensor from a first commercial GPS receiver;

communicating, via a network interface, with a host processing unit that is associated with an array of sensors and has a second commercial GPS receiver and a military GPS receiver;

processing precision position information, from the host processing unit, that is determined as a function of a commercial GPS signal from the second commercial GPS receiver and a military GPS signal from the military GPS receiver;

calculating a precise location of the sensor as a function of the commercial GPS sensor location information and the precision position information; and determining a precise source location of the weapon fire event using the precise location of the sensor, wherein the precise source location of the weapon fire event is more accurate than weapon fire source location information obtained without using the precise location of the sensor.

18. The computer readable medium of claim 17 wherein time of arrival information from a plurality of microphones arranged in an array is used to determine the precise source location without use of bullet shockwave data.

19. The computer readable medium of claim 17, wherein sensor position is provided using a plurality of pseudoranges.

20. The computer readable medium of claim 17, wherein GPS position information is provided using a plurality of pseudoranges.

21. The computer readable medium of claim 17, wherein calculation of the precise location of the sensor includes adjusting commercial GPS sensor location information with correction information determined by the host processing unit.

* * * * *